United States Patent [19]
Taylor et al.

[11] Patent Number: 5,455,689
[45] Date of Patent: Oct. 3, 1995

[54] ELECTRONICALLY INTERPOLATED INTEGRAL PHOTOGRAPHY SYSTEM

[75] Inventors: Roy Y. Taylor, Scottsville; Scott B. Chase, Rochester, both of N.Y.

[73] Assignee: Eastman Kodak Company, Rochester, N.Y.

[21] Appl. No.: 195,231

[22] Filed: Feb. 14, 1994

Related U.S. Application Data

[63] Continuation of Ser. No. 722,713, Jun. 27, 1991, abandoned.

[51] Int. Cl.$^6$ .................................................. H04N 1/387
[52] U.S. Cl. ........................................ 358/450; 358/428
[58] Field of Search .................................. 354/100, 101, 354/110; 352/52, 51; 355/20, 32, 33; 358/428, 450, 38; 359/25, 32, 463, 468, 472; 340/729; 382/57, 49

[56] References Cited

U.S. PATENT DOCUMENTS

| | | | |
|---|---|---|---|
| 2,724,312 | 11/1955 | Gruetzner | 352/81 |
| 3,099,195 | 7/1963 | Goodbar | 352/81 |
| 3,788,726 | 1/1974 | Groh et al. | 359/32 |
| 3,832,027 | 8/1974 | King | 359/32 |
| 4,062,045 | 12/1977 | Iwane | 358/88 |
| 4,414,316 | 11/1983 | Conley | 354/101 |
| 4,463,380 | 7/1984 | Hooks, Jr. | 358/160 |
| 4,468,688 | 8/1984 | Gabriel et al. | 358/22 |
| 4,494,864 | 1/1985 | Smith et al. | 355/22 |
| 4,506,296 | 3/1985 | Marraud et al. | 358/88 |
| 4,521,688 | 6/1985 | Yin | 250/363 S |
| 4,541,007 | 9/1985 | Nagata | 354/101 |
| 4,552,442 | 11/1985 | Street | 354/112 |
| 4,557,954 | 12/1985 | Gundlach et al. | 354/101 |
| 4,590,607 | 5/1986 | Kauth | 382/41 |
| 4,650,282 | 3/1987 | Lo | 350/130 |
| 4,669,812 | 6/1987 | Hoebing | 359/25 |
| 4,674,853 | 6/1987 | Street | 354/112 |
| 4,684,990 | 8/1987 | Oxley | 358/183 |
| 4,704,627 | 11/1987 | Yuyama et al. | 358/88 |
| 4,724,449 | 2/1988 | Wright | 354/112 |
| 4,732,453 | 3/1988 | de Montebello et al. | 350/130 |
| 4,743,965 | 5/1988 | Yamada et al. | 358/88 |
| 4,766,556 | 8/1988 | Arakawa | 340/729 |

(List continued on next page.)

FOREIGN PATENT DOCUMENTS

WO90/08343  7/1990  WIPO ........................... G03B 35/00

OTHER PUBLICATIONS

"Complete Signal Representation With Multiscale Edges", by S. G. Mallat and S. Zhong, N.Y. University, Current Institute of Mathematical Sciences, Technical Report No. 483, Dec. 1989 beginning line 10 on p. 25.

"The Estimation of Velocity Vector Fields From Time–Varying Imaging Sequences", by Sergei Fogel, *CVGIP: Image Understanding*, vol. 53, No. 3, May 1991, pp. 253–387.

*Three Dimensional Imaging Techniques*, by Takanori Okoshi (New York: Academic Press, 1976), pp. 60–75, Chapter 4 in spec beginning line 17 on p. 1 and again at line 25 on p. 4.

*Primary Examiner*—Edward L. Coles, Sr.
*Assistant Examiner*—Jerome Grant, II
*Attorney, Agent, or Firm*—Edward Dugas

[57] ABSTRACT

An integral, autostereoscopic three-dimensional image suitable for lenticular display is generated from a plurality of image perspectives by interpolating additional images from hypothetical perspectives, as follows. Initially, actual image signals are generated from a plurality of actual images obtained from a plurality of actual image perspectives. The additional images are obtained by operating upon the actual image signals and forming interpolated image signals from hypothetical image perspectives. Finally, an integral three-dimensional image is generated from the combination of images obtained from the actual image perspectives and the hypothetical image perspectives, and is suitably displayed. According to one suitable display, the integral image may be exposed upon a photosensitive sheet that is attached to a lenticular faceplate for subsequent viewing.

31 Claims, 5 Drawing Sheets

U.S. PATENT DOCUMENTS

| | | | |
|---|---|---|---|
| 4,808,988 | 2/1989 | Burke et al. | 340/729 |
| 4,821,728 | 4/1989 | Ledley | 128/661.01 |
| 4,825,393 | 4/1989 | Nishiya | 364/560 |
| 4,837,616 | 6/1989 | Kasano et al. | 358/107 |
| 4,853,769 | 8/1989 | Kollin | 358/88 |
| 4,881,068 | 11/1989 | Korevaar et al. | 340/729 |
| 4,905,081 | 2/1990 | Morton | 358/88 |
| 4,937,766 | 6/1990 | Deppe et al. | 364/560 |
| 4,965,705 | 9/1990 | Wright | 358/88 |
| 5,004,335 | 4/1991 | Montes | 352/81 |
| 5,059,771 | 10/1991 | Ip et al. | 235/64.7 |
| 5,063,441 | 11/1991 | Lipton et al. | 358/88 |
| 5,113,213 | 5/1992 | Sandor et al. | 355/22 |

ELECTRONICALLY INTERPOLATED INTEGRAL PHOTOGRAPHY SYSTEM

This is a continuation of U.S. application Ser. No. 722,713, filed 27 Jun. 1991 now abandoned.

BACKGROUND OF THE INVENTION

1. Technical Field

This invention relates to the field of autostereoscope hard copy imaging, and particularly to a method for generating such images using conventional photographic or electronic cameras. More particularly, the invention pertains to recording such images on film in such a manner that a three-dimensional depiction of the recorded scene is visible through an image projecting faceplate without the need for auxiliary optical viewing devices.

2. Background Art

Three-dimensional photography is comprehensively described in *Three-Dimensional Imaging Techniques* by Takanori Okoshi (New York: Academic Press, 1976, translated from the Japanese edition published in 1972) which provides a basis for describing the attributes and advantages of this invention. Okoshi initially distinguishes between truly three dimensional imaging and stereoscopic imaging on the basis of the amount of information involved. The quantity of information for a stereoscopic (or binocular) image is only twice that of a planar (one-dimensional) image, while much greater information is present for a truly three-dimensional image (which is often called an autostereoscopic image). Images of the latter type are truly spatial images that gradually show more of the right side of the object when the observer moves rightward, and more of the left side of the object when the observer moves leftward (which is often referred to as a "look around" capability). Integral photography is a method of recording a complete spatial image, that is, one viewable from a multiplicity of directions, upon a single flat photographic plate. The principles of integral photography were described by G. Lippman in 1908 in a paper read to the French Academy of Science. Integral photography thus has a long history of theoretical consideration and demonstration, but has enjoyed only limited commercial success.

Integral photography refers to the composition of the overall image as an integration of a large number of small photographic image components. Each photographic image component is viewed through a separate small lens usually formed as part of a mosiac of identical spherically-curved surfaces embossed or otherwise formed onto the front surface of a plastic sheet of appropriate thickness. The plastic sheet is subsequently bonded to or held in close contact with the emulsion layer containing the photographic image components. Lenticular photography is a special case of integral photography wherein the small lenses are formed as sections of cylinders running the full extent of the print area in the vertical direction. Recent commercial attempts at lenticular photography have included a multi-lensed 35 mm three-dimensional camera sold by Nimslo Corp., Atlanta, Ga., and a similar camera manufactured by Nishika Optical Systems, a division of Nishika Corp., Henderson, Nev. Though a sense of depth is clearly visible in prints made from these cameras, the resulting images have limited depth realism and appear to the viewer to "jump" as the print is rocked or the viewer's vantage relative to the print is changed.

The product of integral photography, that is, an integral photograph, can be further thought of as an X-Y array of microscopic slide projectors cascaded over the area of the print material. Each tiny lens, or lenslet, projects a microscopic view of the scene from a slightly different perspective than the one next to it. If the viewer's eye was concentrated on a singular lenslet surface, it would see only that portion of the view behind that lenslet which is angularly aligned with the line of sight to that lenslet. If the eye is moved laterally and continues to look at the same lenslet, it will see progressively different laterally angular portions of the view behind that lenslet. However, because the lenslets are made very small relative to the normal viewing distance, their apparent angular diameters may approach or subserve the angular resolution of the eye, with the result that features of the lenslets themselves are not apparent to the viewer, while the light emanating from them is.

The viewer then is able to mentally construct the entire array of optical beams from all lenslets into a recognizable scene without distraction from lenslet features. Since the right eye sees the array from a different vantage than the left eye, autostereoscopic depth perception is also present. By shifting the head laterally relative to the print surface, a changing autostereoscopic view is seen resulting in a "look around" capability which adds to the realism of the display. Integral photography also allows a "look around" capability in the vertical direction as well as the horizontal direction and an autostereoscopic view would also result if the print were rotated ninety degrees such that horizontal lines recorded from the original scene are now extending from bottom of the print to the top.

Since it is likely that most viewers prefer to view their photographs as models or reminders of the real world, it is not likely that they will choose to rotate the print for viewing. It was recognized as early as Lippman that instead of spherical lenslets, long cylindrical lenses extending from the top of the print to the bottom could be used to provide autostereoscopic views (and resultant "look around") in the horizontal direction only. This is sufficient to give a realistic three-dimensional model of the real world. Moreover, since vertical film space is not used to record alternative vertical views, the vertical detail recorded improves and approaches the film resolution limit, giving an improved impression of print quality. The long cylindrical lenses are called lenticules, and the principles of integral photography apply equally well to lenticular photography as long as one views the layouts or optical schematics in planes perpendicular to the cylindrical axis of the lenticules.

An optical method of making lenticular photographs is described by Okoshi in Chapter 4 of the aforementioned book. A photographic camera is affixed to a carriage on a slide rail which allows it to be translated in a horizontal direction normal to the direction of the desired scene. A series of pictures is taken wherein the camera is translated between subsequent exposures in equal increments from a central vantage point to lateral vantage points on either side of the central vantage point. The distance that the lateral vantage points are displaced from the central vantage point is dependent upon the maximum angle through which the lenticular material can project photographic image components contained behind any given lenticule before it begins to project photographic image components contained behind an adjacent lenticule. (It is not necessary to include a picture from the central vantage point, in which case the number of images will be even. If a picture from the central vantage point is included, the number of images will be odd.) The sum of the total number of views contained between and including the lateral vantage points will determine the minimum number of photographic components which eventually will be contained behind each lenticule.

In accordance with the Okoshi book, the negatives resulting from each of these views are then placed in an enlarger equipped with a lens of the same focal length as the camera lens. Since the camera had been moved laterally between successive exposures as previously described, the positions of the images in the original scene will be seen to translate laterally across the film format. Consequently, the position of the enlarged images from the negatives will also appear to move laterally with respect to the center of the enlarger's easel as successive negatives are placed in the film gate.

In making the print, an assemblage is made of a sheet of photographic material oriented with its emulsion side in intimate contact with the flat back side of a clear plastic sheet of appropriate thickness having lenticules embossed or otherwise formed into its front side. The assemblage is placed on the enlarger easel with the lenticular side facing the enlarger lens. The position of this assemblage on the easel is adjusted until the field of the central image is centered on the center of this assemblage, and an exposure of the information being projected out of the enlarger lens is made through the lenticules onto the photographic emulsion.

Subsequently, negatives from the successive exposures are placed in the film gate and the position of this assemblage is readjusted on the easel to reposition each respective view to the center of the assemblage, and additional exposures of the information being projected from the enlarger lens are made. When all the views contained between the lateral vantages have been exposed on the emulsion through the lenticular plastic sheet, the film sheet can be separated from the lenticular plastic sheet and developed. If the aperture of the enlarger lens is set to equal the amount of lateral shift between alternate views, the space behind each lenticule will be found to be exactly filled with photographic image components.

The final step in this process is to again reassemble the photographic film and the plastic sheet with intimate contact between the emulsion layer and the flat side of the lenticular plastic sheet, with the lenticular sheet so positioned laterally that the long strips of adjacent images resulting from exposures through the cylindrical lenticules are again positioned in a similar manner under the lenticules for viewing. This method of image recording is called an "indirect" technique because the final print recording is indirectly derived from a series of two-dimensional image recordings.

Ideally, an integral or lenticular photograph would display an infinite number of different angular views from each lenslet or lenticule. This would be impossible since each angular view must have a corresponding small finite area of exposed emulsion or other hard copy media whence is its source of display. Consequently, as an upper limit, the number of views must not exceed the resolution limit of the hard copy media, and, perhaps practically more significant, must not exceed the resolving power of the lenticules. In the aforementioned camera manufactured by Nimslo, the number of views behind each lenslet or lenticule was limited to four views, two of which were considered left perspective views and the remaining two were right perspective views. This was well below the resolution limit of the photographic emulsion and allowed for only two options for stereoscopic viewing perspectives as the viewer's head was moved laterally. Consequently, an unrealistic image jump results when the viewer's vantage moves relative to the separate views on the print and the viewing conditions for "inverse stereo" are increased wherein the right eye sees the image intended for the left eye and vice versa. (This methodology, however, allows for many more stereoscopic views. For example, the 1969 Annual Report to Stockholders of Eastman Kodak Company displays a lenticular photo comprising a large number of alternate views of the scene. The resulting print is much more effective than with fewer views.)

The concept of integral photography by an indirect technique is also described in U.S. Pat. Nos. 4,724,449 and 4,956,705, naming Douglas Wright as inventor, and assigned to Dimensional Visions Group of Philadelphia, Pa. U.S. Pat. No. 4,724,449 describes a photographic camera with a laterally shifting film holder to capture a number of perspectives of a scene and to record image information onto different negatives for eventual processing into three-dimensional prints. While the method of providing a viewable print from negatives so obtained is not described in this patent, only lateral camera motion is described and therefore a viewing method providing horizontal image separation is most likely. The other Wright patent (U.S. Pat. No. 4,956,705) describes the same image capture process as the '449 patent using video CCD array cameras rather than photographic cameras and further discusses capturing the images using a "frame grabber" board in a computer which freezes a frame of a still or moving object and digitizes the image for further processing, such as by software "paint" type programs.

Horizontal image separation may also be provided through raster occlusion, such as by using a Ronchi ruling on a faceplate spacially located in front of the composite print so as to prevent the images intended for viewing by the right eye to be seen by the left eye and vice versa. The technique of raster occlusion is described in textbooks such as *Foundations of the Stereoscopic Cinema* by Lenny Lipton (New York: VanNostrand Reinhold, 1982, pages 74, 166, 287) and *Stereoscopy* by N. A. Valyus (Focal Press, 1966). Compared to lenticular methods, however, raster occlusion suffers from the additional problem of reduced image brightness.

The prior methods of optically recording scenes on lenticular print material so that the angular presentations of the lenslets correspond correctly with the angular orientations of the original scene rely upon the aforementioned "indirect" printing process. In contrast, U.S. Pat. Nos. 4,552,442 and 4,674,853, naming Graham S. B. Street as inventor, teach a "direct" method of recording images with correct angular correlation. In this method, the converging bundle of optical rays from a very large aperture camera lens is directed onto a sheet of lenticular material to which photographic film has been affixed in the same manner as described in the aforementioned projection method. In optical terms, the apertures of the respective lenslets form the sub-apertures which sample the taking lens aperture. Left-right image correspondence is properly established by reflecting the converging beam from a beamsplitter onto a retroreflecting surface. In the geometric space between the object field and the taking lens, different aperture coordinates, or positions on the aperture of the taking lens, represent different perspectives of the object field. Bundles of light rays leaving the taking lens from localized sub-apertures within the taking lens aperture are relayed by different lenslets on the lenticular film array to the photographic emulsion layer for exposure. Problems include light losses from the beamsplitter and multiple optical reflections, and the need for a uniformly accurate retroreflector sheet with elements not substantially larger than the display print lenticules. Moreover, the depth of field of the camera lens severely limits the photographic space, and the camera itself is extremely large, necessitating the use of large format film sheets for each copy.

To summarize, in prior art techniques the means of increasing the number of perspectives depended on one of two basic methods:

1. The "indirect" method of photographing the subject field from different perspectives either by shifting the camera, if a single camera is being used, or by adding additional cameras at different perspectives, with a means of synchronizing the camera shutters to open at the same instant in time. When one camera is used by shifting between exposures to capture alternative perspectives, the subject field is limited to stationary objects, an unacceptable limitation to photographic freedom for the photographer. The use of multiple cameras which are synchronized for exposure solves this problem, but adds to equipment complexity and cost, particularly where a large number of views are required for autostereoscopic realism.

2. A "direct" method of photographing the subject field by employing a large aperture taking lens on the camera and sampling the light rays leaving the taking lens from different aperture coordinates by the smaller apertures represented by the retroreflector cascading onto the lenticules on the lenticular film assemblage. This system limits the space which can be recorded to the depth of field of the taking lens which in turn must be used in a wide open condition in order to "see" the object field over the entire range of aperture coordinates. This constraint also represents an unacceptable limitation on the photographer's freedom.

SUMMARY OF THE INVENTION

The object of the present invention is to generate a lenticular photograph by the indirect method, using a sufficiently large number of angular views in order to produce an autostereoscopic integral photo that makes the transitions between angular views inconspicuous to the print viewer.

A further object is to use a minimal number of conventional cameras for image acquisition while retaining as much photographic space as is possible in terms of both depth dimension and ambient light conditions, thus allowing for hard copy prints of varying magnifications from the given camera formats.

The inventors have departed from conventional integral lenticular photography, in which the photographic elements appropriate for each lenticule are exposed by optical means, by proposing the generation of a proportion of the photographic elements appropriate for each lenticule by electronic interpolation. The interpolated and actually acquired photographic elements may then be combined to obtain an autostereoscopic integral lenticular photograph. This may be done without the complexity of large numbers of optical systems as required by the "indirect" systems or the cited apparatus drawbacks of the "direct" systems.

In a method and apparatus according to the invention, an integral three-dimensional image suitable for lenticular display is generated from a plurality of image perspectives by basically practicing three steps, as follows. Initially, actual image signals are generated from a plurality of actual images obtained from actual image perspectives. Secondly, additional images are obtained by operating upon the actual image signals and forming interpolated image signals from hypothetical image perspectives that are spatially interposed between the actual image perspectives. Finally, an integral three-dimensional image is generated from the combination of images obtained from the actual image perspectives and the hypothetical image perspectives.

BRIEF DESCRIPTION OF THE DRAWINGS

The invention will be described in relation to the drawings in which.

MODE(S) FOR PRACTICING THE INVENTION

Figure 1:
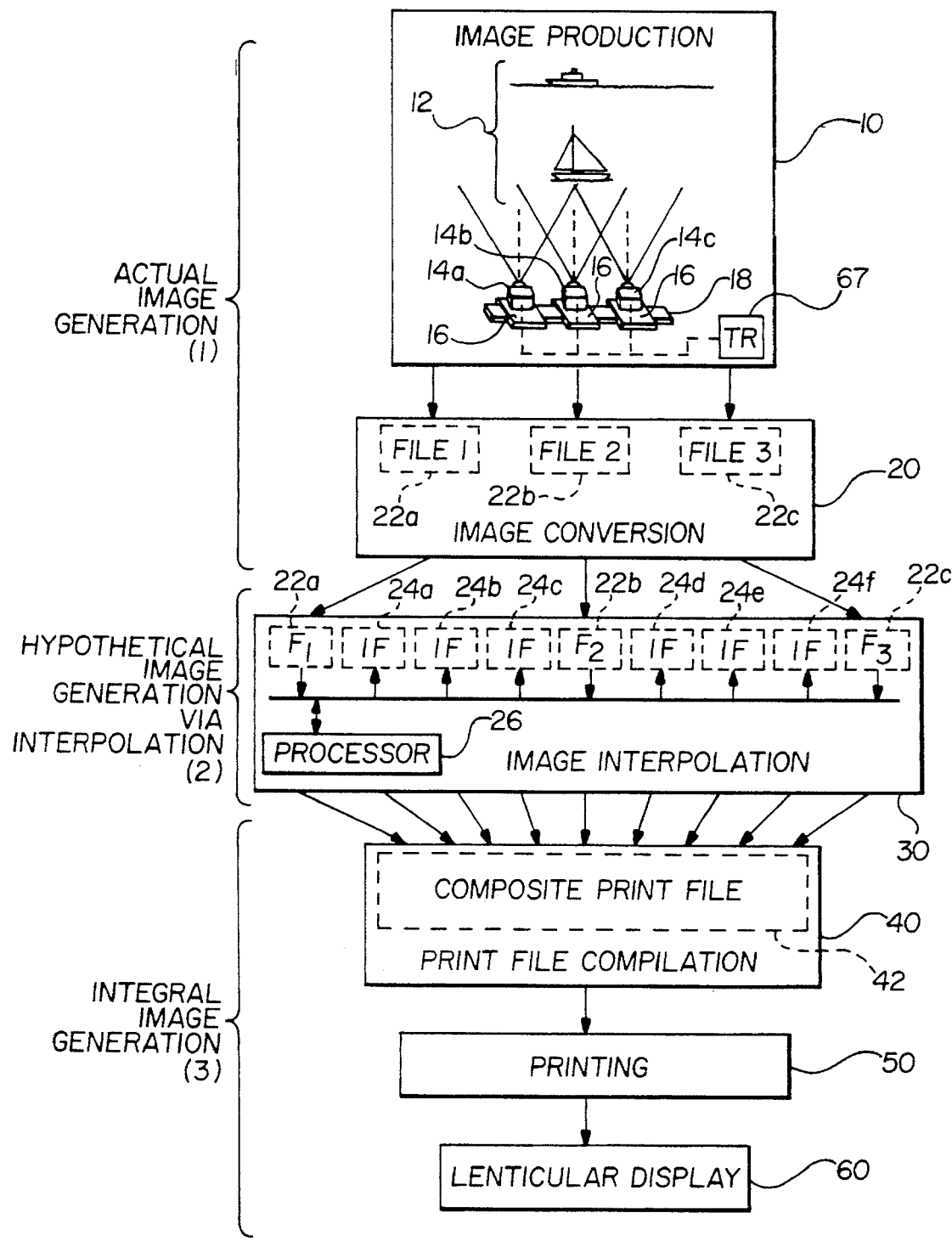
FIG. 1 is a block diagram of an electronically interpolated integral photography system according to the invention.

An electronically interpolated integral photography system operating according to the invention is illustrated in the block diagram shown in FIG. 1 as having three basic components: actual image generation (1); hypothetical image generation via interpolation (2) from the actual image information; and integral image generation (3) from the actual and interpolated image information.

Actual image generation (1) involves the generation of actual images (block 10) and the conversion of the actual images to electronic image signals (block 20). Such image signals represent the brightness and (if in color) the chromaticity of each image point. In the first (image generation) block 10 an actual three-dimensional scene 12 is photographed by at least three conventional (photographic or electronic) cameras 14a, 14b, 14c each aligned beforehand by the photographer on, e.g., separate carriages 16 affixed to a slide rail 18 to simultaneously capture different perspectives of the scene. The slide rail 18 allows the carriages 16, and the cameras 14a, 14b, 14c therewith, to be positioned or translated in a horizontal direction normal to the direction of the desired scene 12. The number of cameras 14a, 14b, 14c required depends in part on the correct modeling of complex features in the object field such as shadows or partially occluded objects, and therefore could exceed three, that is, more than three different perspectives of the scene might be desirable for certain applications. In the second (image conversion) block 20 the resulting negatives (or, in the case of an electronic sensor, the image-related charge on the picture elements) from the cameras are electronically converted to digital image signals representing digital bit-maps 22a, 22b, 22c of the actual images provided at each actual perspective by the respective cameras 14a, 14b, and 14c. Each bit map is a representation of the image in which each picture element (pixel) is represented by bits stored in memory.

Hypothetical image generation via interpolation (2) is embodied in the third (image interpolation) block 30, which schematically illustrates the image interpolation operation. The image signals corresponding to the bit-maps 22a, 22b, 22c (for files $F_1$, $F_2$, $F_3$) of the images from all actual perspectives are compared with each other in a processor 26 to, e.g., recognize common image features, and the resultant information is used to generate interpolated image signals representative of additional bit-maps 24a . . . 24f of additional images taken from alternate perspectives by mathematically interpolating the information from the actual perspectives. While the number of alternate, interpolated bit-maps to be generated by the processor 26 is determined by the geometry of the lenticular faceplate to be used for display, the spatial sampling rate for the interpolated bit maps need not exceed the print media resolution, the printer lens resolution, or the lenticule resolution.

Integral image generation (3) involves the generation of a composite print file (block 40), the printing of that file (block 50), and the display of the resultant copy (block 60). In the fourth (composite print file) block 40 a composite bit-map file 42 is compiled from the interpolated image signals and the actual image signals. The composite file contains strips of data elements corresponding to the strips of photographic elements from the different perspectives that make up the ultimate integral photograph. In the fifth (printing) block 50, a print emulsion or other hard copy media (transparent or reflective) is exposed by an electronic or optical printer which projects pixels or otherwise exposes pixels on the print media in correspondence to the signals in the composite print file. In the sixth (lenticular display) block 60 the print (or duplicate thereof) is displayed through a series of lenticules with a spatial pitch typically equal to the maximum number of views times the pixel pitch on the print media.

Since the means of displaying the composite print image depends on the lenticular faceplate, and because the effectiveness of the display depends on providing as many alternative perspectives as possible while simultaneously not exceeding the spatial pixel density of the printer-media combination or the like lenticule resolution, as well as keeping the lenticules small to reduce the distraction of their features, a review of the basic mathematics of the lenticular display is appropriate.

Figure 2:
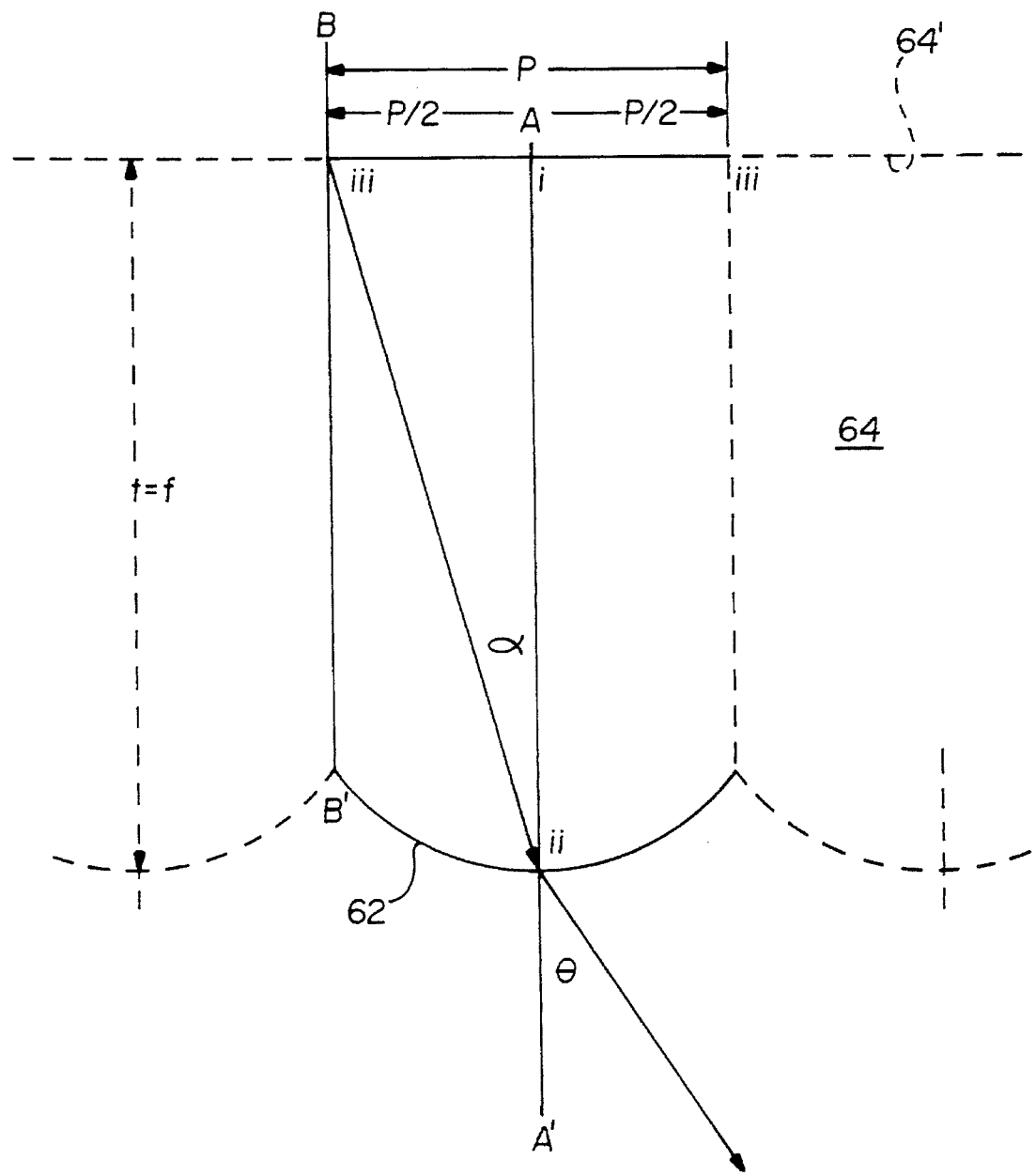
FIG. 2 is an optical diagram showing the geometry of a single lenticule.

The geometry of a single lenticule as shown in FIG. 2. The thickness t of the lenticule is equal to its focal length f. This is achieved by molding or embossing a curved surface 62 of appropriate radius on the front surface of a plastic sheet 64 of index of refraction n. The width of the lenticule is p, which suggests an analogy to spatial pitch by its intended similarity to adjacent lenticules. At the center of the lenticule, a line A—A', at a distance p/2 from either edge, is normal to the flat back surface 64' of the faceplate. This intersection with the back surface is labelled point i. Line A—A' intersects the curved surface 62 on the front surface at point ii. By geometry, the center of curvature of the curved surface 62 will lie on line A—A' and is normal to the curved surface at point ii. A second line B—B' parallel to A—A' is drawn from the left edge of the curved surface the point where this lenticule ends and the nominally identical adjacent lenticule begins. Line B—B' intersects the flat back surface 64' at point iii. If an optical ray is drawn from point iii to point ii, it forms an angle a with line A—A'. By Snell's Law this optical ray will be refracted to a new angle r, which is related to the input angle of incidence a as follows:

$$a = \sin^{-1}((\sin r)/n) \quad (1)$$

where n is the index of refraction of the sheet 64. By trigonometry:

$$a = \tan^{-1}(p/2f) \quad (2)$$

Substituting Equation (2) into Equation (1) and solving for r:

$$r = \sin^{-1}(n * \sin(\tan^{-1}(p/2f))) \quad (3)$$

The angle r in the illustration (FIG. 2) then becomes the maximum angle through which the lenticular material 64 can project photographic image components contained behind any given lenticule. This in turn defines the displacement between the respective cameras 14a, 14b, 14c on the slide rail 18 (FIG. 1).

Figure 3:
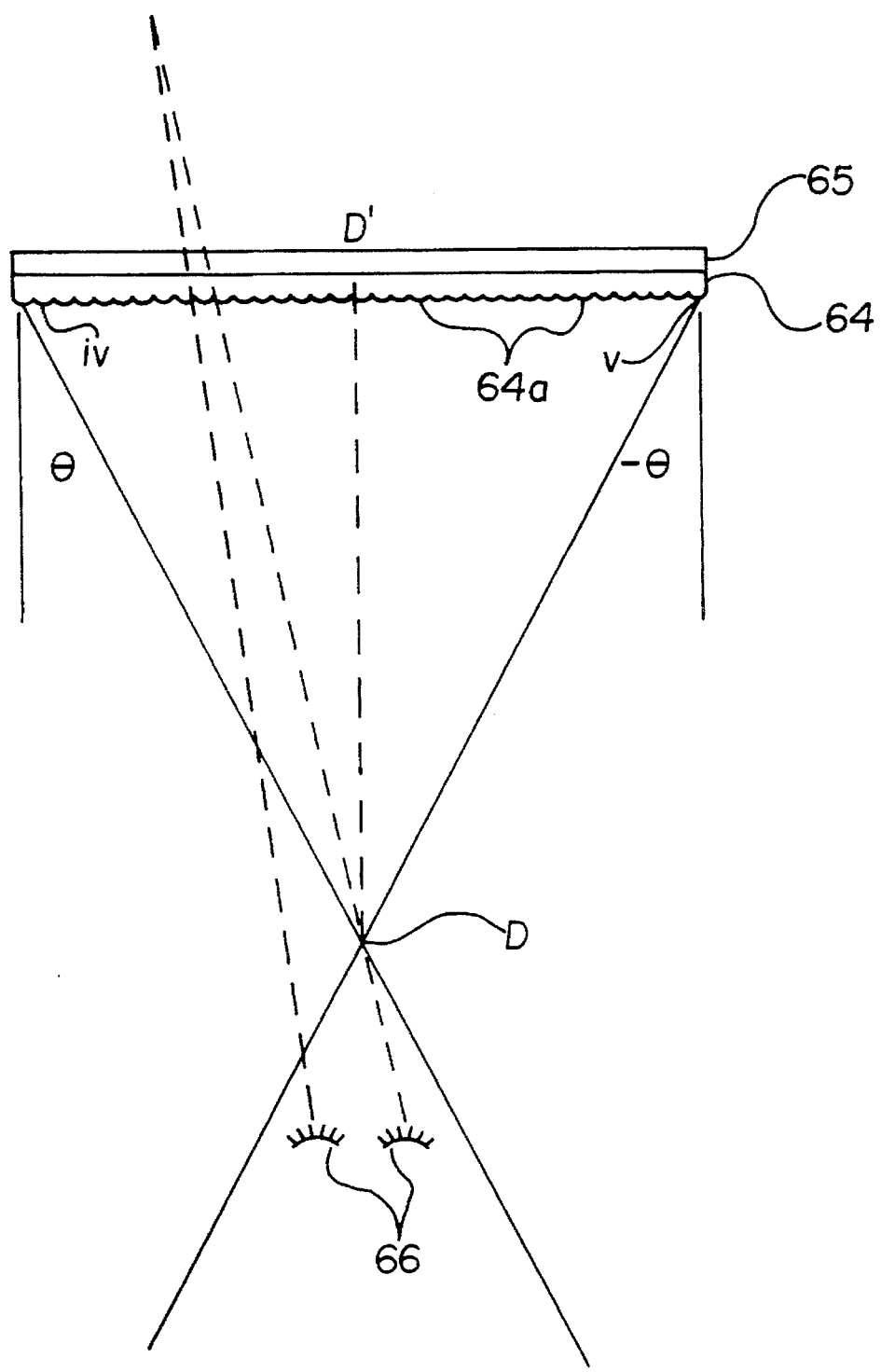
FIG. 3 is a section of a lenticular faceplate.

FIG. 3 illustrates a typical section of lenticular faceplate material 64 as seen from a cross-section normal to the axis of the lenticules 64a. The lenticules are all of the same nominal focal length f (as derived from Equation (3)) and the print media 65 is positioned behind the lenticular array 64 at an optical distance substantially equal to this focal length. Lines are drawn from the points iv and v at edges of the lenticular faceplate 64 at angles r and −r, respectively and intersect at point D in front of the faceplate 64. A line D—D' perpendicular to the back surface of the faceplate is drawn from this intersection. Point D then is the best absolute viewing position. However, if D' is considered the zero point on a distance scale measured from the faceplate 64 and if both of a viewer's eyes 66 are placed anywhere between the lines D-iv and D-v at a distance beyond D, unique information can be displayed to each eye from any point on the faceplate, with the consequent potential of stereopsis and look around capability.

Each element of the integral photography system will now be discussed in greater detail.

A. Image Production (Block 10)

The desirability of using conventional cameras and film to acquire the necessary depth information represents value added to existing systems that are already in the marketplace. The added requirements for the cameras are minimal. It is necessary to use either cameras that have electrical shutter releases or at least predictable and repeatable mechanical shutter releases. The camera optical lenses will nominally be of the same focal length and the film formats all the same (e.g., 35 mm). Therefore, the easiest expedient will be to use multiple cameras of the same design; photographers may thus find that using this image capture system will only require acquisition of additional cameras of a design they are already satisfied with.

Nonetheless, a single camera with plural imaging sections, that is, plural optical systems focusing image light upon respective sections of light recording media, may be used instead of separate cameras positioned on a rail or like support. Furthermore, the more cameras used, or the more optical systems present, the more detail that can be represented. This is true particularly for "look around" situations where certain objects may be obscured in one view but not in another. Finally, a single camera with a single optical system could be used, particularly for static image situations, and moved for each additional picture. Such a camera would, e.g., be positioned on one carriage 16 and movably supported on the slide rail 18 (FIG. 1) to sequentially acquire an image from each of the image perspectives.

Film types can be chosen by the photographer to enhance characteristics which best emphasize artistic expression of ideas or the accommodation of difficult photographic conditions. For example, negative films have greater photographic exposure latitude than positive materials and may be preferred by some photographers. Film processing options are already in place and do not require revision or special handling. Material availability is widespread and standardization of performance can be expected.

If several cameras are utilized, a shutter-release synchronizing device would be provided to assure that all cameras expose images at the same time to assure that moving objects will represent information from the same scene volume for all cameras. For example, a switching circuit 67 (FIG. 1) can be provided, which simultaneously triggers all of the electrical shutter release cameras; similarly, solenoids may be provided for simultaneously triggering all of the mechanical shutter release cameras. While the preceding discussion assumes that conventional film cameras are being used, known electronic cameras of various types may also be used in practicing the invention. In such cases, an electronic sensor is used in place of film in each of the cameras. As in the case of photographic cameras, one electronic camera with several optical systems may be used to simultaneously acquire images from the several perspectives, or a single electronic camera with a single optical system may be supported for movement through the several image perspectives to sequentially acquire images.

There are a number of considerations to be made before the number of different cameras and perspectives is finally decided. If one uses a similar rationale to that used for robotic vision systems, the minimum number of different perspectives could be as few as three. While two cameras can be used to create a single stereoscopic representation of a scene, an alternate stereoscopic representation will require at least one additional camera. Such an alternate representation is believed to be necessary to provide fuller autostereoscopic realism and a "look around" capability. It would then be possible to generate as many interior alternate perspectives by image interpolation as desired. However, additional real perspectives can improve the final demonstration by improving the sampling of highly-structured and overlapping scenes. This kind of decision represents a design trade-off between the additional cost of simultaneously capturing additional perspectives and degree of depth scene realism expected in the final image demonstration. Furthermore, camera alignment has been described in relation to parallel positions on a linear track, but could also be defined by rotating a camera about a point in the object field as described in the aforementioned book by Okoshi.

There are two generalities which can be observed in the alignment of the cameras: firstly, either the cameras are carefully aligned relative to each other on a fixture, (such as the rail 18, FIG. 1), or a temporary target array may instead be placed in the scene volume; secondly, the cameras can be aligned by the photographer to assure adequate sampling of the high priority subject material within the scene volume, which may also include a window target through which the desired scene is seen. If the relative alignment of the cameras is predetermined, the image interpolation algorithm need not be mindful of the subject detail, but only the geometry of the cameras' alignments. What occupies a particular sample of volume within the scene volume would only require copying the correct bit-map 22a, 22b, 22c information from the scanned data to the interpolated data 24a . . . 24f, and thence to the final composite print bit-map 42. If the alignment is obtained by a target array or window, the scanned data bit-maps 22a, 22b, 22c for adjacent actual perspectives have to be compared to recognize the window features and to correct the image distortion before additional data calculations can proceed. Systems based on both generalities could be used interchangeably by photographers, depending on the complexity of image material being recorded or the degree to which the final image is expected to be faithful to the original scene.

Rather than being produced by conventional electronic or photographic cameras, the "actual" images can instead be digital representations of data from computer files. This data may, e.g., result from computer aided design of hypothetical parts and assemblies and would directly represent the brightness and chromaticity (if in color) of such parts and assemblies. Such data would correspond to actual designations of image points in the computer-generated image as viewed from a plurality of operator-designated image perspectives. Except for image conversion, which has already been accounted for, the remainder of the processing (interpolation, etc.) will be as described in accordance with the invention.

B. Image Conversion (Block 20)

It is necessary to convert the scene information from each camera into digital bit-maps 22a, 22b, 22c, for later image interpolations and collation to the display bit-map. Any of a number of commercially-available film scanners could be used to pixelize the photographic images. Such scanners read 35 mm film negatives or positives with linear type sensors, advancing the film slightly between each line of information. The data, line by line, is recorded in an image file in memory. Depending on the mode of storage, many different perspectives of the same scene may be stored in one image file, even several sets of different images, for eventual printing. Photographic film, particularly 35 mm slides, can also be scanned by a variety of desktop slide scanners for input to a personal computer. Exemplary scanners include the Nikon LS-3500 scanner (Nikon, Inc., Garden City, N.Y.), the Eikonix 1435 scanner (Eikonix, Bedford, Mass.), and the Barneyscan slide scanner (Barneyscan Corp., Alameda, Calif.) Typical scanners incorporating linear sensors are also described in numerous references, for example, U.S. Pat. Nos. 4,105,316 and 4,281,351, which are incorporated herein by reference.

While the discussion above for image production generally assumes that film cameras were being used, it should be recognized that if electronic cameras were being used, the output from the camera sensor, e.g., a CCD array, would directly result in a pixelized representation of the scene. Image scanning would therefore not be needed. This representation can be converted to a bit-map representation by conventional output detection of the pixel charges and analog-to-digital conversions of the resultant analog signal. However, since the pixelized image structure of photographic films has a resolution at least an order of magnitude better than the best electronic CCD array and because the inclusion of depth information increases the demand for resolution, the use of photographic film will probably continue to find considerable potential. In some cases, such as the aforementioned computer files, highly-structured bit-maps of electronically-generated data represent the best image information available and could be converted directly to hard copy images using the proposed system.

C. Image Interpolation (30)

Figure 4:
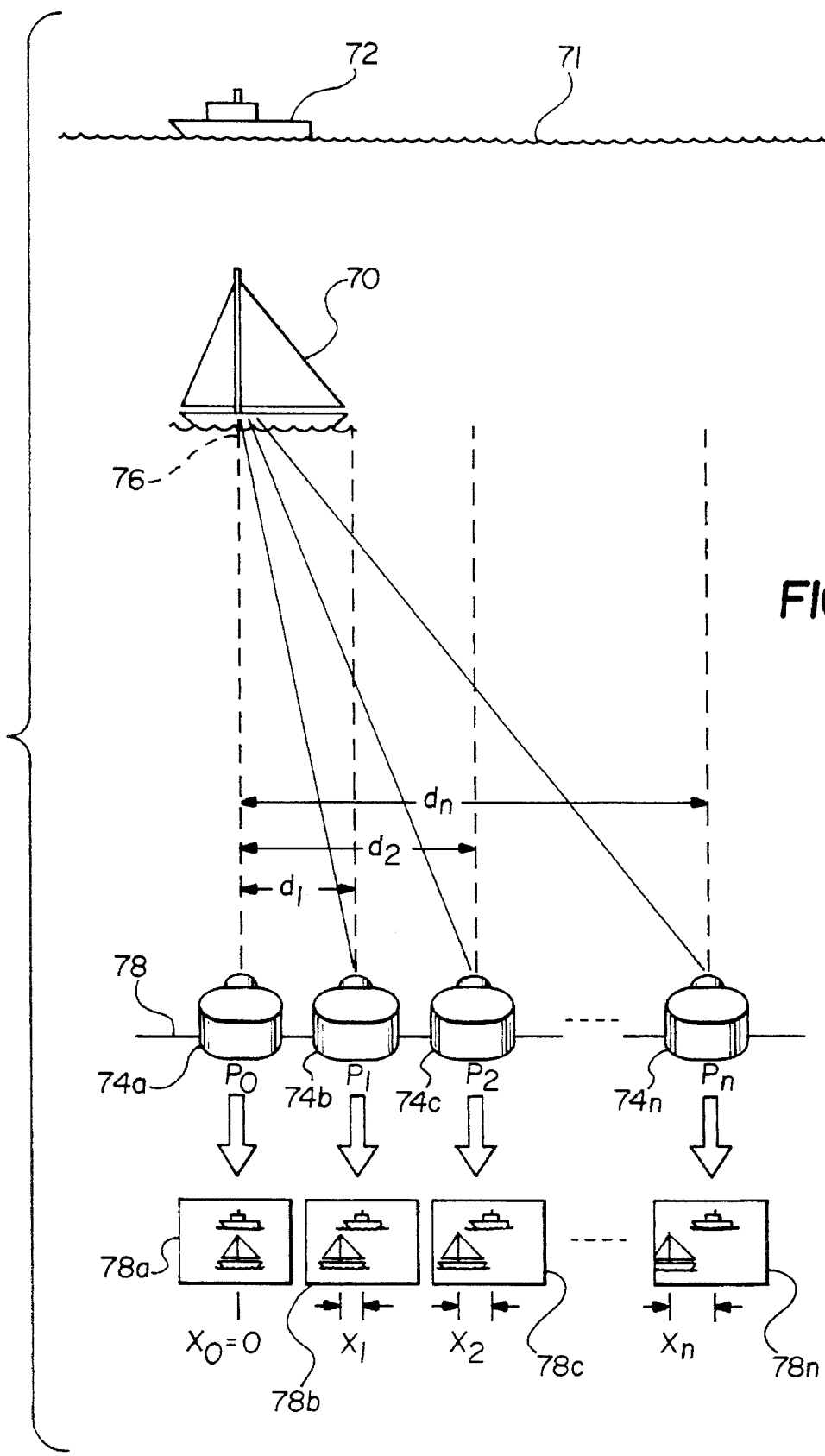
FIG. 4 is an illustration of a typical three-dimensional situation showing the placement of a plurality of cameras for a plurality of actual perspectives.

While it is desirable to keep the number of cameras low to minimize complexity in the image production system, it may be desirable to record as many perspectives as possible as long as the photographic recording resolution is not overtaxed. Alternative perspectives in excess of the recorded perspectives are then generated according to the invention by image interpolation. One simple example of the task is shown in FIG. 4. This scene includes a sailboat 70 floating in the foreground with the water horizon 71 in the background and a second boat 72 floating at the distant horizon. If this scene was recorded by a series of cameras 74a, 74b, 74c . . . 74n all pointed at the same compass bearing 76, but differing in location along a line 78 normal to that compass bearing, the position (x) of the closer boat 70 in the respective images 78a, 78b, 78c . . . 78n from the various cameras in the series would appear to change laterally ($x_1$, $x_2$, . . . $x_n$) while the details of the horizon 71 and object 72 on the horizon would appear to have the same lateral position in all the images.

Moreover, the lateral position of the closer boat 70 in any given camera image would be seen to have a mathematical relationship to the distance that particular camera had been located in the original camera series from the camera that recorded the boat at the center of its image. In particular, the position (x) progressively increases as the lateral position is shifted to the right. In terms of the example, the sailboat 70 in the foreground is centered in the image from the camera located at perspective $p_0$. The power craft 72 on the horizon 71 is centered within the angular fields of all the cameras in the series of perspectives $p_0$ to $p_n$. For cameras 74b, 74c . . . 74n at perspectives $p_1$ through $p_n$, the image of the sailboat will be recorded to the left of the picture center by amounts $(x_1, x_2, \ldots x_n)$ proportional to the distances the respective cameras were from the camera 74a at perspective $p_0$. Given this proportionality, the location of the image of the closer boat for some perspective falling between two recorded perspectives could be calculated.

Figure 5:
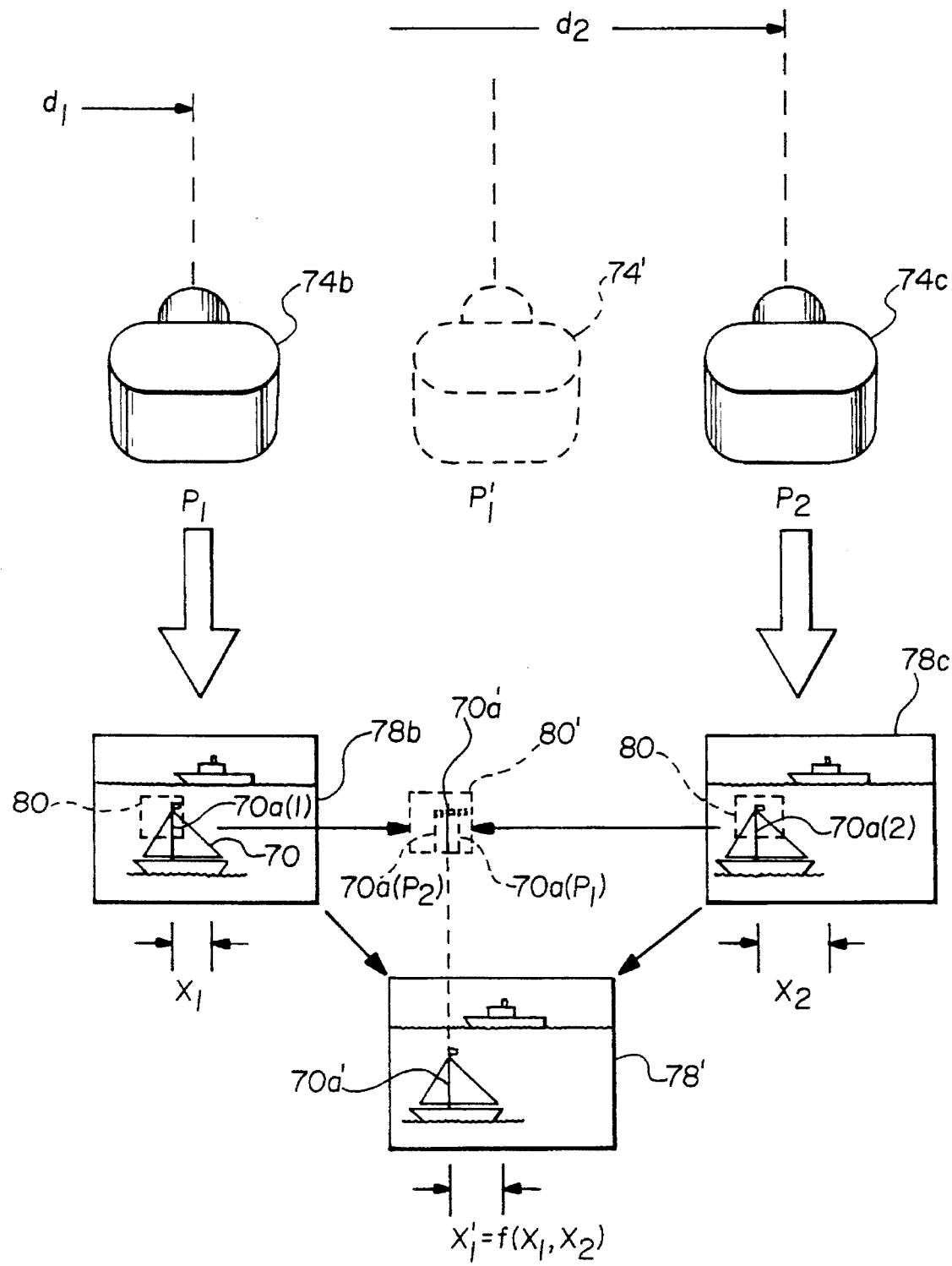
FIG. 5 is an illustration of a picture interpolated according to the invention from a hypothetical perspective interposed between two actual perspectives.

In FIG. 5, an alternate perspective $p'_1$, which is located halfway between perspectives $p_1$ and $p_2$ of FIG. 4, is depicted (at which a hypothetical camera 74' produces a hypothetical image 78'). Even though the alternate perspective $p'_1$ was not actually recorded, an image approximating its appearance could be produced by measuring the locations of the closer boat in images 78b and 78c located at perspectives $p_1$ and $p_2$ and locating the isolated image of the closer sailboat at a position halfway between the two outer images 78b and 78c. FIG. 5 illustrates a typical situation wherein conjugate points, that is, corresponding points viewable from each of the actual perspectives $p_1$ and $p_2$, are located and observable in both actual images 78b and 78c. The coordinates of such conjugate points can be determined by conventional image processing techniques based, for example, on the neutral density or the color densities of points within the images or, for example, within a special image region 80. For example, if image points of the mast 70a of the foreground boat 70 are centered within the region 80 in the image 78b, it is reasonable to expect the same densities and alignment of densities (as correspond to the mast 70a) within the same region 80 in the image 78c. In this manner, conjugate points in both images 78b and 78c can be identified, and a hypothetical image 78' with a mast 70'a halfway between the conjugate points calculated. (This is seen in the centrally constructed region 80', where the hypothetical location of the mast 70'a is halfway between the image of the mast from the first perspective $p_1$ (that is, $70a(p_1)$) and the image of the mast from the second perspective $p_2$ (that is, $70a(p_2)$). The "half-way" position, clearly, is a matter of choice and depends upon the selected location of the interior perspective $p'_1$. This identification and calculation would ordinarily be done by the programmed processor 26 included in the image interpolation block (30). Such programming is within the skill of an ordinary practitioner of these arts.

This kind of image isolation and transposition would also be manually possible using computer-based imaging programs based on edge detection. For example, Staphane G. Mallat and Siren Zhong describe a method for mathematically defining edges in images in a paper *Complete Signal Representation with Multiscale Edges* published by the New York University Dept. of Computer Science (Technical Report 483, December, 1989). Their model is based on wavelet formalization of multiscale transforms and has many applications for pattern analysis. In this paper, they show that multiscale edges can provide a complete and stable description of signals. By applying their algorithm to an image, it is transformed to a series of lines looking much like an artist's line drawing rendition of the picture. By changing a threshold value above which the wavelet maxima must lie, the amount of lines represented in this rendition will change: the higher the threshold, the fewer the number of lines (edges) which would be included. If this were done similarly for two of the perspectives in the sailboat illustration described earlier, features such as the outline of the sails, wave edges in the water, and details of the distance clouds could easily be visually recognized in each of the perspectives and tagged for movement to an interpolated position. A representation of an interpolated edge map could then be generated and then transformed back to a continuous tone image by numerical reconstruction from the wavelet transform maxima described in the Mallat and Zhong paper.

The quality of the interpolation from such a procedure would depend on the degree of thoroughness that edges were identified and relocated. A good interpolated image for such an alternative perspective might result if the edges of all features in and adjacent to the closer boat were independently calculated and transposed to generate the final alternate perspective. The ultimate interpretation of "adjacency" in this context would be to include all features in the recorded perspectives of the object field, but would probably necessitate a significant amount of operator time.

An improved approach to image interpolation not requiring human judgment and image manipulation can utilize a computer algorithm described in a paper entitled: *The Estimation of Velocity Vector Fields from Time-varying Image Sequences,* by Sergei Fogel and published in *Computer Vision, Graphics, and Image Processing; Image Understanding* (vol. 53, No. 3, May, 1991, pgs. 253–287). The Fogel paper is incorporated in this application by reference for purposes of indicating the background of the invention and the state of the art which the invention draws upon. It is believed that one of ordinary skill in the art of interpolating and processing images can use the Fogel paper as one technique for performing the image interpolation utilized by the present invention. According to the Fogel paper, changes in successive images from a time-varying image sequence of a scene can be characterized by velocity vector fields. The estimate of the velocity vector field is determined as a compromise between optical flow and directional smoothness constraints.

To illustrate the basic algorithm, consider an observer viewing the sailing scene with eyeglasses which greatly blurred the image. (The equivalent condition for persons who normally wear glasses is to view the scene without wearing their glasses, a condition which many people will find familar since they confront this condition each daybreak upon awakening.) If that observer were to be "instantly" transported to some other (laterally-displaced) vantage point from which to view the sailing scene, even though the scene were blurred for their vision, they would be able to identify the major components of the scene and estimate the relative movements of them even though the identification of details and possibly even objects was not possible. A pictorial representation of these relative movements could be to draw vectors superimposed on a sketch of the major components of the field representing the observer's estimate as to how much each of the major components had moved.

A similar blurring condition can be mathematically introduced to bit-map representations of images by averaging each pixel's values of density and chromaticity with the corresponding values for surrounding pixels. The blurring function can be altered by weighting the averages either to emphasize the central pixel values or surrounding pixel values and can be configured to incorporate pixel values from increasingly large radii from the central pixel. A reduced spatial sampling of an image using pixels with values of density and chromaticity so altered can then be thought of as a pixel cluster map. The pixel clusters of one image are then successively compared to pixel clusters in a second image of the same scene from a different vantage for correlations. That pixel cluster from the second image with the closest match for averaged density and chromaticity values with any given pixel cluster in the first image has a high probability of representing the same major component of the scene in both images. The sailboat in the foreground is a major component that could be represented by several pixel clusters which appear to move with similar velocity vectors of substantially equal magnitude to the left as the vantage point is moved to the right, while the boat in the distance would be represented by several pixel clusters which had essentially zero magnitude velocity vectors.

In areas where large variations of velocity vector magnitudes are seen, the blurring function could be revised to encompass fewer pixels in the averaging process and therefore provide a better discrimination of velocity vector components. This process of deciding when and how to reduce the size of pixel clusters is part of the constraint tradeoff between optical flow and smoothness earlier cited. Most importantly, using this algorithm approach, the edge features of the image do not need to be known to make reasonable predictions of what images would look like from some hypothetical vantage point or point in time which were interpolated from two other images that were captured on a photosensitive surface.

Initially, this algorithm was applied to motion picture images to remove blur resulting from object motion recorded during the time intervals the camera shutter was open, and later to allow generation of video frames at 30 frames per second from movie frames shot at 24 frames per second. Both of these problems are examples of a more general image science descriptor called the motion correspondence problem. The typical current method utilized in telecine conversion can be demonstrated with a standard VHS video cassette player which has a pause-slow advance feature. As a movie is watched a frame at a time with this advance, the image is seen to change for four frames and then repeat a frame for one frame, and then the cycle is repeated. Considering this playback mode in real time, the movie image is speeded up from 24 frames per second to 30 frames per second, for $4/30$ seconds, and then halted for $1/30$ to let the sound recording resynchronize with the video image.

Using the mathematical approach developed by Fogel, it has been demonstrated that new video frames separated in time by $1/30$ second intervals can be generated from $1/24$ second interval movie frames as well as sharpening the movie frame images which have motion blur. As a consequence, a starting frame from the 24 frames per second movie is also the starting frame for the 30 frames per second video, the next video frame is interpolated from frames 1 and 2 of the movie, the third video frame interpolated from frames 2 and 3; and so on until the 5th video frame is the same as the 4th movie frame. The interpolation algorithm calculates vectors representing the change in position for features in the images. New vectors with the same directions, but new lengths proportional to the time differences expressed above, are then calculated and then applied to generate the new frames with edge features shifted by the amounts of the new proportional length vectors. Reliable estimation of velocity vector fields is very important for the analysis of time-varying image sequences. The temporal variations in the images of the sequence specified by the velocity vector fields can be used to extract spatial information about the scene. They can also be used to extract information characterizing the movements of the objects in the scene. Stereopsis can be considered as a special case of image-sequence analysis where the number of images is restricted to two and the displacement direction is known.

The need to generate alternate stereoscopic perspective views from captured perspectives becomes another manifestation of the general motion correspondence problem and is mathematically similar to telecine conversion, and can be simplified by a physical constraint to the cameras so that all the perspective shifts will result in "velocity" vectors with a common direction. The term "velocity" in this context represents an anomaly with the ordinary definition of displacement divided by time. The generated "velocity" vectors of edge feature changes now represent changes in position due to camera location rather than temporal movement.

A further image processing system, describing a multidimensional spatial transformation useful therewith for interpolation, is disclosed in U.S. Pat. No. 4,468,688, entitled "Controller for System for Spatially Transforming Images" and incorporated herein by reference. The interpolation methodology disclosed therein is believed to be useful by one of ordinary skill as another interpolation method for implementing the present invention. Furthermore, a preferred embodiment will probably utilize more than two actual views in order to interpolate an additional view from the actual views. For instance, three views may be necessary in order to optimally show depth perception, particularly to show realistic "look around" viewing. Since some of the information contained in the three views is redundant, information corresponding to somewhat less than three views may be optimal.

D. Composite Print File (40)

In the science of image analysis and simulation, once an image has been represented as a bit-map, each subdivided unit of the picture, termed pixels, are assigned densities and chromaticities. This information can later be used to generate an electronic print of the image which would look similar to an optical print of the negative. However, the bit-map representation of the image can be altered mathematically in various ways to invert and increase density amplitudes relative to some threshold value, to assign alternate chromaticity values to certain chromaticities and to apply algorithms which alter certain pixels which are similar to or distinctly different from adjacent pixels, thereby allowing electronic prints to be made which have the clarity and definition of optical prints, but do not represent the real scene whence they came. Moreover, by using video monitors, equipment and techniques have been developed to display the results of original or altered bit-maps allowing the results of this image transformation in almost real time, or certainly with minimal delay, which is useful for persons who generate the images. The process of converting pixel values for density and chrominance is done before printing and the final bit-map file is called the print file. The creation of composite image files for lenticular viewing is further described in U.S. Pat. No. 4,506,296, the disclosure of which is incorporated herein by reference.

The generation of the composite print file used for lenticular faceplate viewing can also be visualized by considering the concept of a scene window. Consider that the original object scene was being viewed through a window in an otherwise opaque wall. The multiple camera perspectives, both captured and interpolated, represent information of the object scene as would be seen from different angular positions in front of the scene window. Information available from the various image files for anything other than the window apertures would be discarded. If the lenticular print were now placed in the aperture of the scene window and was the same size as the scene window, a unity model of the object scene would result if the information behind each lenticule was properly printed from all of the camera perspectives, both actually produced and interpolated. Each point in the scene window would have an infinite number of angular lines of sight possible, while each point in the lenticular print has a finite number of angular lines, limited by the spatial pitch of the pixels printed on the display media and the spatial pitch of the lenticules.

E. Printing (50)

A number of means for printing have been devised for making hard copy representations of print files. An early means used was to convert the print files to a video signal and display the image on a cathode ray tube screen. This in turn could be imaged onto photosensitive material using an optical lens and an exposure made for the appropriate amount of time. A second method is to direct laser beams, modulated by the image information, onto a rotating polygon of plano-optical facets which causes the reflected beam to repeatedly scan across the photosensitive material while the material is slowly advanced through the exposure gate. A third and preferred method for this application, is electronic scan printing. In this method, a combination of red, blue, and green optical beams is combined by mirrors and beamsplitters into a single beam which is focused onto the photosensitive surface by a high quality (or diffraction limited) lens, like a microscope objective. The photosensitive surface, such as the emulsion layer on photographic film, is moved relative to the focussed, three color beam as the optical power emitted from the lens is modulated in accordance with the print file. In some systems, the combination of red, green, and blue is accomplished by temporal sequencing rather than optical combination, but the result is similar because exposure is accumulative.

Any of the above methods could be used for making a hard copy of the composite print file, but the scan printing option offers the greatest control for scan line straightness and position accuracy, both of which are necessary for accurate angular display of the information when placed behind the lenticular faceplate. Commercially-available electronic scan printers with accurate location of pixel printing include the McDonald-Dettwiler Model FIRE 1000 and the Kodak Digital Film Recorder (Model LVT 1620A). The latter scanner, which records on paper as well as film, is manufactured by Light Valve Technology, a division of Eastman Technology, Inc., which is a subsidiary of Eastman Kodak Company. The LVT 1620A accepts digital input and provides a high resolution, continuous tone photographic-quality output.

F. Lenticular Display (60)

The display that is constructed may be useful for either transmissive or reflective viewing. In either case, the material printed in the printing step (50) is developed and, as necessary, fixed, into an unalterable hard copy (i.e., a photographic material is developed into a print or transparency, an electrostatic copy is toned and heat fused, etc.). As shown in FIG. 3, the hard copy is subsequently affixed to a lenticular faceplate comprised of a clear optical material (glass, plastic, etc.) having an array of generally convex refractive optical surfaces embossed or otherwise formed on the display side thereof. The faceplate has a thickness, as measured to the hard copy surface, equivalent to the focal length of the refractive optical surfaces.

If the hard copy material is transparent, the assemblage is illuminated from the side opposite to the faceplate for viewing by transmitted light passing through the transparent hard copy and the faceplate. If the hard copy material includes an underlying light-reflective layer, the assemblage is illuminated from the same side as the faceplate for viewing by reflected light passing through the faceplate, reflecting from the reflective layer, and passing back through the image-containing hard copy material and the lenticular faceplate.

Commercial Applicability and Advantages

Images are essentially models of the real world which can be displayed to help the viewer recall or visualize a event in time or understand a concept. The historical development of photography has effectively improved images by improving the amount of detail present in the model, by accommodating ever greater limits of photographic space, and using color to impart realism. There has been a historical fascination with stereoscopic photography, but the complications of the image recording equipment and viewing apparatus has always complicated the commercial success of stereo cameras and viewers. It is widely felt that an autostereoscopic display is necessary to reduce inconvenience to the viewer and to allow images to be shared in real time. However, although effective autostereoscopic means have been demonstrated by integral and lenticular photography, the cost and complexity of equipment to record a sufficient number of alternate perspectives for effective display has in itself been a limitation to commercial success. As a consequence, depth still imaging remains to be the one unconquered aspect of imaging which is not effectively modelled. The presently described system for integral photography provides a way of generating a large number of alternate perspectives from a fewer number of actual images thereby reducing the cost and complexity of the equipment while increasing the realism of the display.

The method described in this disclosure allows an autostereoscopic image to be generated from a small number of conventional cameras, thus retaining the general simplicity of stereo photography and allowing the photographer to exercise the same range of options which is possible with conventional photography. Enlargements and reductions are possible with simple means. The image information can be captured with either chemical or electronic camera systems and prints could be made with photographic or other print media systems. Because the spatial density of optical information is significantly higher than planar prints, the inherent resolution capabilities of photographic materials will be favored in high quality applications.

The invention has been described in detail with particular reference to a presently preferred embodiment, but it will be understood that variations and modifications can be effected within the spirit and scope of the invention.

What is claimed is:

1. A method for generating an integral three-dimensional image from a plurality of image perspectives, said method comprising the steps of:

generating actual image signals from a plurality of actual images obtained from a plurality of actual image perspectives;

interpolating additional images by operating upon actual image signals to form interpolated image signals obtained from hypothetical image perspectives that are spatially interposed between the actual image perspectives by detecting edges of image features and utilizing the detected edge locations to interpolate between the actual images to obtain additional images from hypothetical image perspectives; and generating an integral three-dimensional image from the combination of images obtained from the actual image perspectives and the hypothetical image perspectives.

2. A method for generating an integral three-dimensional image suitable for display through a lenticular faceplate, having a predetermined lenticular pitch, from a plurality of image perspectives, said method comprising the steps of:

acquiring a plurality of actual images from a plurality of actual image perspectives at substantially the same point in time, said actual image perspectives being separated in distance as a function of the lenticular pitch;

converting the plurality of actual images into actual digital image signals;

interpolating digital image signals by operating upon actual digital image signals to form interpolated digital image signals representing interpolated images taken from hypothetical image perspectives that are spatially interposed between the actual image perspectives by detecting image features and utilizing the detected feature locations to interpolate between the actual images to obtain additional images from hypothetical image perspectives;

generating a composite print file from the combination of actual and interpolated digital image signals taken from the actual and hypothetical image perspectives; and printing an integral image suitable for lenticular viewing upon photosensitive material in response to the digital signals stored in the composite print file.

3. Apparatus for generating an integral three-dimensional image of an object viewed from a plurality of image perspectives, said integral image suitable for lenticular display through a lenticular faceplate, said apparatus comprising:

means for generating actual image signals from a plurality of actual images obtained from a plurality of actual image perspectives;

means for interpolating additional images by operating upon actual image signals from spatially separated actual images to form interpolated image signals obtained from hypothetical image perspectives that are spatially interposed between the spatially separated, actual image perspectives comprising means responsive to the actual image signals for recognizing image features and deriving therefrom the interpolated image signals; and means for generating an integral three-dimensional image from the combination of actual image signals and interpolated image signals obtained from the actual image perspectives and the hypothetical image perspectives.

4. A method for generating an integral three-dimensional image from a plurality of image perspectives, said method comprising the steps of:

generating a plurality of image signals of images of a three-dimensional image from a corresponding plurality of actual image perspectives along a plurality of viewing axes with the images being arrayed in a direction normal to a principle viewing axis of image view;

forming additional image signals by operating upon said generated plurality of image signals to form interpolated image signals taken from hypothetical image perspectives that are spatially interposed between selected ones of the plurality of image perspectives; and generating an integral three-dimensional image from the combination of the generated and formed images obtained from the actual image perspectives and the hypothetical image perspectives.

5. A method as claimed in claim 4 wherein the step of generating a plurality of image signals comprises the steps of:

producing a plurality of images from a plurality of actual image perspectives; and converting the plurality of images into a plurality of image signals.

6. A method as claimed in claim 5 wherein the step of producing a plurality of images produces a plurality of photographic transparencies and the step of converting the plurality of images into a plurality of image signals comprises scanning the transparencies with a scanning beam to generate a plurality of image signals.

7. A method as claimed in claim 4 wherein the step of generating an integral three-dimensional image comprises the steps of:

generating a composite print file composed of said plurality of image signals and said interpolated image signals;

printing the integral three-dimensional image represented by the composite print file directly upon a photosensitive material; and forming a lenticular display from the combination of the photosensitive material and a lenticular sheet.

8. A method as claimed in claim 7 wherein the step of printing the integral three-dimensional image represented by the composite print file comprises:

generating a visible display from the composite print file; and optically directing the visible display onto the photosensitive material.

9. A method as claimed in claim 7 wherein the step of printing the integral three-dimensional image represented by the composite print file comprises electronically scan printing the photosensitive material with a light beam that varies in correspondence to the signals in the composite print file.

10. A method as claimed in claim 7 wherein the step of printing the integral three-dimensional image represented by the composite print file comprises generating a video signal from the print file, producing a video display from the video signal, and optically exposing the photosensitive material to the video display.

11. A method as claimed in claim 7 wherein the step of printing the integral three-dimensional image represented by the composite file comprises scanning the photosensitive material with a laser beam that is modulated in correspondence to the signals in the composite print file.

12. A method as claimed in claim 7 wherein the step of forming a lenticular display comprises affixing a lenticular sheet to photosensitive material that is transparent for transmissive viewing.

13. A method as claimed in claim 7 wherein the step of forming a lenticular display comprises affixing a lenticular sheet to a photosensitive material having a reflective underlayer for viewing by reflected light.

14. A method as claimed in claim 4 wherein said step of forming additional image signals comprises characterizing the changes in successive images as velocity vector fields, and utilizing the vector fields to interpolate between successive images to obtain additional image signals representing images from hypothetical image perspectives.

15. A method for generating an integral three-dimensional image from a plurality of image perspectives, said method comprising the steps of:

generating a plurality of image signals of a three-dimensional image from a corresponding plurality of real image perspectives along a plurality of viewing axes;

forming additional image signals by operating upon said generated plurality of image signals to form interpolated image signals taken from hypothetical image perspectives that are spatially interposed between selected ones of the plurality of image perspectives; and generating an integral three-dimensional image from the combination of the generated and formed images obtained from the real image perspectives and the hypothetical image perspectives, wherein said plurality of image signals are digital representations of data from computer files, said digital representations corresponding to measures of hue and saturation at locations in a computer-generated image as viewed from a plurality of designated actual image perspectives.

16. Apparatus for generating an integral three-dimensional image of an object viewed from a plurality of image perspectives, said integral three-dimensional image suitable for lenticular display through a lenticular faceplate, said apparatus comprising:

means for generating a plurality of image signals of images of a three-dimensional image obtained from a plurality of actual image perspectives along a plurality of viewing axes with the images being arrayed in a direction normal to a principle axis of image view;

means for forming additional images by operating upon the generated plurality of image signals from spatially separated actual images to form interpolated image signals obtained from hypothetical image perspectives that are spatially interposed between selected ones of the spatially separated, actual image perspectives; and means for generating an integral three-dimensional image from the combination of the plurality of image signals and interpolated image signals obtained from the actual image perspectives and the hypothetical image perspectives.

17. Apparatus as claimed in claim 16 wherein said means for generating an integral three-dimensional image comprises:

means for generating a composite print file composed of said plurality of image signals and the interpolated image signals, the combination thereof representative of an integral image;

means for printing the integral image upon photosensitive material in response to signals in the composite print file; and means for forming an integral assemblage comprising the combination of the photosensitive material and a lenticular faceplate.

18. A method for generating an integral three-dimensional image suitable for display through a lenticular faceplate, having a predetermined lenticular pitch, from a plurality of image perspectives, said method comprising the steps of:

acquiring a plurality of actual images from a plurality of actual image perspectives along a plurality of viewing axes at substantially the same point in time the images being arrayed in a direction normal to a principle axis of image view, said actual image perspectives being separated in distance as a function of the lenticular pitch;

converting the plurality of actual images into actual digital image signals;

forming interpolated digital image signals by operating upon said actual digital image signals so as to represent interpolated images taken from hypothetical image perspectives that are spatially interposed between the actual image perspectives;

generating a composite print file from the combination of actual and interpolated digital image signals taken from the actual and hypothetical image perspectives; and printing an integral three-dimensional image suitable for lenticular viewing, upon photosensitive material in response to the digital image signals stored in the composite print file.

19. A method as claimed in claim 18 wherein said step of printing an integral three-dimensional image further comprises affixing the photosensitive material to a lenticular faceplate having an array of generally convex refractive optical surfaces formed on the display side thereof.

20. A method as claimed in claim 18 wherein the step of printing an integral three-dimensional image comprises:

generating a visible display from the composite print file; and optically directing the visible display upon the photosensitive material.

21. A method as claimed in claim 18 wherein the step of printing an integral three-dimensional image comprises electronically scanning the photosensitive material with a light beam that varies in correspondence to the signals in the composite print file.

22. A method as claimed in claim 18 wherein the step of printing an integral three-dimensional image comprises scanning the photosensitive material with a laser beam that is modulated in correspondence to the signals in the composite print file.

23. A method as claimed in claim 18 wherein said step of acquiring a plurality of actual images comprises producing a plurality of images with a plurality of cameras which record substantially planar representations of the images, said plurality of cameras positioned to capture a plurality of actual image perspectives.

24. A method as claimed in claim 18 wherein said step of acquiring a plurality of actual images comprises producing a plurality of images with a single camera having plural optical sections offset from each other to record substantially planar representations of plural images from a plurality of actual image perspectives.

25. A method as claimed in claim 18 wherein said step of acquiring a plurality of actual images comprises producing a plurality of images with a camera that is movably supported for positioning in a plurality of camera positions corresponding to the real image perspectives to acquire substantially planar representations of the plural actual images from the actual image perspectives.

26. A method as claimed in claim 18 wherein said step of forming interpolated digital image signals comprises characterizing the changes in successive images as velocity vector fields, and utilizing the vector fields to interpolate between successive images to obtain additional image signals representing images from hypothetical image perspectives.

27. Apparatus as claimed in claim 17 wherein said means for printing the integral image comprises means for electronically scanning the photosensitive material with a light beam that varies in correspondence to the image signals in the composite print file.

28. Apparatus as claimed in claim 16 wherein said means for generating a plurality of image signals comprises:

means employing at least one optical system for producing a plurality of images from the object as viewed from a plurality of actual image perspectives; and means for converting the plurality of images into a plurality of image signals.

29. Apparatus as claimed in claim 28 wherein said means for producing a plurality of images includes a plurality of cameras for capturing substantially planar representations of the images.

30. Apparatus as claimed in claim 28 wherein said means for producing a plurality of images comprises a single camera having plural lateral optical sections offset from each other to record substantially planar representations of plural images from a plurality of actual image perspectives.

31. Apparatus as claimed in claim 28 wherein said means for producing a plurality of images comprises a single camera and means for movably supporting said single camera in each of the actual image perspectives.

* * * * *

UNITED STATES PATENT AND TRADEMARK OFFICE
CERTIFICATE OF CORRECTION

PATENT NO. : 5,455,689
DATED : October 3, 1995
INVENTOR(S) : Roy Y. Taylor, Scott B. Chase

It is certified that error appears in the above-indentified patent and that said Letters Patent is hereby corrected as shown below:

```
Column 8, line 15, after "capability." insert --As can be seen
in figure 3 the eyes 66 view the images created by the
faceplate 64 along a principle viewing axis which is generally
normal to the faceplate and is normal to the direction in which
the images are arrayed as illustrated in figure 4.--
```

Signed and Sealed this

Third Day of September, 1996

*Attest:*

BRUCE LEHMAN

*Attesting Officer*    Commissioner of Patents and Trademarks